(12) United States Patent
Fan

(10) Patent No.: US 9,712,059 B2
(45) Date of Patent: Jul. 18, 2017

(54) DIRECTLY AMPLIFIED RIPPLE TRACKING CONTROL SCHEME FOR MULTIPHASE DC-DC CONVERTER

(71) Applicant: Texas Instruments Incorporated, Dallas, TX (US)

(72) Inventor: Jiwei Fan, Cary, NC (US)

(73) Assignee: Texas Instruments Incorporated, Dallas, TX (US)

(*) Notice: Subject to any disclaimer, the term of this patent is extended or adjusted under 35 U.S.C. 154(b) by 55 days.

(21) Appl. No.: 14/042,262

(22) Filed: Sep. 30, 2013

(65) Prior Publication Data

US 2015/0091535 A1 Apr. 2, 2015

(51) Int. Cl.
*H02M 3/04* (2006.01)
*H02M 3/158* (2006.01)

(52) U.S. Cl.
CPC .. *H02M 3/1584* (2013.01); *H02M 2003/1586* (2013.01)

(58) Field of Classification Search
CPC ....... B23K 11/248; G05F 1/13; H02M 3/1584
USPC ........................................ 323/237, 246, 272
See application file for complete search history.

(56) References Cited

U.S. PATENT DOCUMENTS

| | | | | |
|---|---|---|---|---|
| 5,994,885 A | * | 11/1999 | Wilcox et al. | 323/285 |
| 7,301,400 B1 | * | 11/2007 | Dening | 330/276 |
| 7,782,036 B1 | * | 8/2010 | Wong | H02M 3/156 323/282 |
| 8,405,368 B2 | * | 3/2013 | Laur et al. | 323/237 |
| 2004/0036452 A1 | * | 2/2004 | Brooks | H02M 3/1584 323/237 |
| 2010/0109622 A1 | * | 5/2010 | Miki | H02M 3/1584 323/272 |
| 2013/0002212 A1 | | 1/2013 | Fan | |

OTHER PUBLICATIONS

"Design and Characterization of Differentially Enhanced Duty Ripple Control (DE-DRC) for Step-Down Converter," IEEE Transactions on Power Electronics, vol. 24, No. 12, Dec. 2009, pp. 2714-2725 (Fan, et al.).

"A Monolithic Buck Converter Using Differentially Enhanced Duty Ripple Control," IEEE 2009 Custom Integrated Circuits Conference (CICC), pp. 527-530 (Fan, et al.).

* cited by examiner

*Primary Examiner* — Nguyen Tran
*Assistant Examiner* — Monica Mata
(74) *Attorney, Agent, or Firm* — Lawrence J. Bassuk; Charles A. Brill; Frank D. Cimino

(57) ABSTRACT

A controller for a multiphase power converter has a plurality of DC to DC converters coupled in parallel between a voltage source and a single output terminal is provided. The controller includes a voltage sensing circuit coupled to the output terminal. An internal pulse generating circuit is couplable to the voltage sensing circuit for generating an internal pseudo-pulse width modulated signal. An ON time signal distribution circuit is couplable to an output of the internal pulse generating circuit and couplable to driver circuit for driving each of the plurality of DC to DC converters. A multiphase power converter and method also disclosed.

8 Claims, 10 Drawing Sheets

DIRECTLY AMPLIFIED RIPPLE TRACKING CONTROL SCHEME FOR MULTIPHASE DC-DC CONVERTER

FIELD OF THE INVENTION

The present invention relates to a multiphase power converter and to a controller for a multiphase power converter.

BACKGROUND OF THE INVENTION

DC to DC converters are electronic circuits that convert a source of direct current from one voltage to another. Switching DC to DC converters are commonly used because of their higher efficiency, which is especially important when the electronic device connected to the DC to DC converter is a battery-powered portable device.

FIG. 1 illustrates an example DC-DC converter 100 based on a step-down switching circuit particularly suitable for meeting many of the general goals for supplying power to advanced digital circuits. Circuit 100 in FIG. 1 (simplified to facilitate illustration and discussion) is called a DE-DRC (Differentially Enhanced-Duty Ripple Control) circuit. The DE-DRC design has been previously published by the present inventor and others. See, for example, J. Fan, X. Li, S. Lim, and A. Huang, "Design and Characterization of Differentially Enhanced Duty Ripple Control (DE-DRC) for Step-Down Converter," *IEEE Trans. Power Electron.*, vol. 24, no. 12, pp 2714-2725, December 2009. In FIG. 1, a power source 102 provides direct current at an input voltage $V_{IN}$.

The circuit 100 provides direct current to a load ($R_{LOAD}$) at an output voltage $V_{OUT}$. Two electronic switches (SW1, SW2) are controlled by a switch control circuit 110 and driver 112. At most only one switch is closed at any one time. A comparator 108 controls the switch control circuit 110. There are two feedback paths. In a first feedback path, the voltage $V_{SW}$ on the switched side of the inductor $L_O$ is coupled to the comparator 108 through a low pass filter ($R_R$, $C_R$). In a second feedback path, two differential difference amplifiers (104, 106) generate a differential pair of feedback signals, $V_P$ and $V_N$. These two differential signals are coupled to comparator 108, where $V_N$ is directly coupled, and $V_P$ is coupled through a high pass filter ($C_R$, $R_R$).

$V_P$ and $V_N$ are as follows:

$$V_P = K_P(HV_{OUT} - V_{REF}) + V_{OUT}$$

$$V_N = -K_N(HV_{OUT} - V_{REF}) + V_{OUT}$$

Where $H = R_{S2}/(R_{S1} + R_{S2})$, $K_P$ = gain of positive differential circuit 104, and $K_N$ = gain of negative differential circuit 106, and $V_{REF}$ is a constant reference voltage.

The first feedback path coupling $V_{SW}$ to the comparator 108 is fast because there are only passive components between $V_{SW}$ and the comparator. The feedback path coupling $V_{OUT}$ to the comparator 108 is slower, because $V_{OUT}$ is proportional to the integral of current in $C_{OUT}$, and there are active amplifiers between $V_{OUT}$ and the comparator. The second loop can adjust the control bandwidth. Both loops have a big influence on the transient response. The two feedback loops combined provide a stable system with high bandwidth control.

To simplify the discussion, assume H=1 and $V_{IN}$ is constant. First, consider the steady state (constant load). In the steady state, with H=1, $V_{CONTROL}$ (the positive input of the comparator 108) is approximately $V_{OUT}$. $V_{SW}$ is a square wave, having an average value of approximately $V_{OUT}$, and low-pass filtered $V_{SW}$ contributes a sawtooth waveform having an average value of approximately the average value of $V_{SW}$ to $V_{RIPPLE}$ (the negative input of the comparator 108). When $V_{RIPPLE}$ drops below $V_{CONTROL}$, comparator 108 causes switch control circuit 110 to close SW1 for a constant on-time. $V_{SW}$ is driven higher while SW1 is closed, and $V_{OUT}$ is controlled to be approximately equal to the average value of $V_{SW}$. If the load current increases, the average value of $V_{SW}$ increases rapidly (because of increasing current through $L_O$), $V_P$ has a transient decrease ($V_{OUT}$ decreases due to an increased current draw from $C_{OUT}$), $V_N$ has a transient increase, and the duty cycle of SW1 is increased (switching frequency increases). If the load current decreases, the average value of $V_{SW}$ rapidly decreases, $V_P$ has a transient increase, $V_N$ has a transient decrease, and the duty cycle of SW1 is decreased. The magnitude of $V_{RIPPLE}$ at the negative input of the comparator 108 is relatively large compared to the ripple voltage on $V_{OUT}$, which provides good noise immunity in the feedback signal. In addition, the circuit provides a fast response to load transients over a wide input and output range.

FIG. 2 shows an improved controller disclosed in co-pending commonly-assigned application Ser. No. 13/171,283 having common inventorship with the present application (see FIG. 3). This application is incorporated herein by reference in its entirety and for all purposes.

In FIG. 2, there are three feedback paths. In a first feedback path, the voltage $V_{SW}$ on the switched side of the inductor $L_O$ is AC coupled to the comparator 208. In a second feedback path, two differential difference amplifiers (204, 206) generate a differential pair of feedback signals, $V_P$ and $V_N$. These two differential signals are coupled to comparator 208, where $V_N$ is directly coupled, and $V_P$ is coupled through a high pass filter network ($C_{R1}$, $R_R$)($C_{R2}$, $R_{DC}$). In a third feedback loop, the reference voltage is adjusted by a reference adjust circuit 214.

$V_P$ and $V_N$ are as follows:

$$V_P = K_P(HV_{OUT} - V_{REF} \text{ adjusted}) + V_{BIAS}$$

$$V_N = -K_N(HV_{OUT} - V_{REF} \text{ adjusted}) + V_{BIAS}$$

Where $H = R_{S2}/(R_{S1} + R_{S2})$, $K_P$ = gain of positive differential circuit 204, and $K_N$ = gain of negative differential circuit 206, $V_{REF}$ adjusted is a variable reference voltage, and $V_{BIAS}$ is a fixed reference voltage.

The first feedback path coupling $V_{SW}$ to the comparator 208 is fast, because $V_{RIPPLE}$ is proportional to AC current in inductor $L_O$, and there are only passive components between $V_{SW}$ and the comparator. The feedback path coupling $V_{OUT}$ to the comparator 208 is slower, because $V_{OUT}$ change is proportional to the integral of AC current in $C_{OUT}$, and there are active amplifiers between $V_{OUT}$ and the comparator. The feedback path adjusting $V_{REF}$ is intentionally very slow to avoid interference with the first two feedback paths. The third feedback path provides better output voltage accuracy. The three feedback paths combined provide a stable system with high bandwidth control and accurate output voltage.

These two control circuits are well-suited for controlling a single phase DC to DC converter power supply. However, there is a growing need for high amperage power supplies. For example, if one needs a 180 amp power supply and has an existing design for a 30 amp power supply, this need may be met by combining 6 of the 30 amp power supplies in parallel. This saves the cost of redesigning the power supply for higher amperage but it creates a problem which will be illustrated below in connection with FIGS. 3 and 4.

This problem is most easily explained utilizing a multiphase power supply comprising two DC to DC converters connected in parallel (phases 1 and 2, respectively) and having a single output terminal connected to a load. FIG. 3 illustrates the waveforms, generally indicated as 300, for the case where this two-phase system is operating at a 20% duty cycle. The current signal sensed for phase 1 is shown in FIG. 3A as 302. The current signal sensed for phase 2 is shown as 304 in FIG. 3B. The current sense signals 302, 304 are combined in FIG. 3C to yield ripple signal 306. In FIG. 3D, the ripple signal 306 is compared against a comp signal 308. When the ripple signal falls below the comp signal 308 (which is the output voltage of an error amplifier which compares a feedback voltage with a reference voltage), an ON pulse trigger signal such as 310, 312, 314, 316, 318 and 320 illustrated in FIG. 3F, is generated. The first ON pulse trigger signal 310 triggers the generation of a PWM signal 322 for phase 1, as shown in FIG. 3G. The second pulse trigger signal 312 triggers the generation of a PWM signal 324 for phase 2, as shown in FIG. 3H. The third ON pulse trigger signal 314 triggers the generation of PWM signal 326 for phase 1 (FIG. 3G). The fourth ON pulse trigger signal 316 triggers the generation of PWM signal 328 for phase 2 (FIG. 3H), and so on.

FIG. 4 illustrates the waveforms of the same circuit as FIG. 3, generally indicated as 400, except that the duty cycle has been increased to 50%. The current signal sensed for phase 1 is shown in FIG. 4A as 402. The current signal sensed for phase 2 is shown as 404 in FIG. 4B. The current sense signals 402, 404 are combined in FIG. 4C to yield ripple signal 406. The problem is that if both phases have equal currents and are exactly 180° out of phase, the current signals 402, 404 will cancel out and no ripple signal would be available to control the converters. Therefore, when the signal 406 is compared to the signal comp, no ON pulse trigger signals are generated as shown at 408 in FIG. 4E. Therefore, no PWM signals are generated for both phases 1 or 2 as shown in FIGS. 4F and 4G. Thus, the multiphase power converter is out of control. Even if the currents to each of the DC to DC converters were not the same and/or were not exactly out of phase, the ripple signal that results would be very small so that noise signals in the millivolt range could cause erratic operation of the multiphase power converter Although the problem is most easily illustrated with a 2 phase multiphase power converter, the problem is common to any multiphase power converter system using combined current information for control. For a 3 phase system, the maximum duty cycle before this problem appears is 33.3%. For a 4 phase converter the maximum duty cycle before this problem appears is 25%. For the 6 phase converter discussed above, the maximum duty cycle before this problem appears is an unacceptable 16.6%. In general, the maximum duty cycle allowable before this problem appears is 1/n*100%, where n is the number of phases in the multiphase power converter system.

Therefore, there is a need for a controller for a multiphase power converter in which the duty cycle is not so limited.

SUMMARY OF THE INVENTION

It is a general object of the invention to provide a controller for multiphase power converter comprising a plurality of DC to DC converters coupled in parallel and having a single output terminal couplable to a load and a multiphase power converter utilizing this controller.

In an aspect of the invention a multiphase power converter comprises a plurality of DC to DC converters coupled in parallel and having a single output terminal couplable to a load. A voltage sensing circuit is coupled to the output terminal. A pulse generating circuit is coupled to the voltage sensing circuit for generating a pseudo-pulse width modulated signal. An ON time signal distribution circuit is coupled to an output of the pulse generating circuit. A driver circuit is coupled to the ON time signal distribution circuit for driving each of the plurality of DC to DC converters.

In an aspect of the invention a controller for a multiphase power converter which comprises a plurality of DC to DC converters coupled in parallel between a voltage source and a single output terminal is provided. The controller comprises a voltage sensing circuit coupled to the output terminal. A pulse generating circuit is couplable to the voltage sensing circuit for generating a pseudo-pulse width modulated signal. An ON time signal distribution circuit is couplable to an output of the pulse generating circuit and couplable to driver circuit for driving each of the plurality of DC to DC converters.

An aspect of the invention includes a method of driving a plurality of parallel connected DC to DC converters. A voltage is sensed across an output of the converters. A pseudo-pulse width modulated signal is generated. A constant ON time signal is distributed to each of the plurality of DC to DC converters. Each of the plurality of DC to DC converters is driven with the constant ON time signal.

BRIEF DESCRIPTION OF DRAWINGS

Further aspects of the invention will appear from the appending claims and from the following detailed description given with reference to the appending drawings.

DETAILED DESCRIPTION OF EXAMPLE EMBODIMENTS

Figure 1:
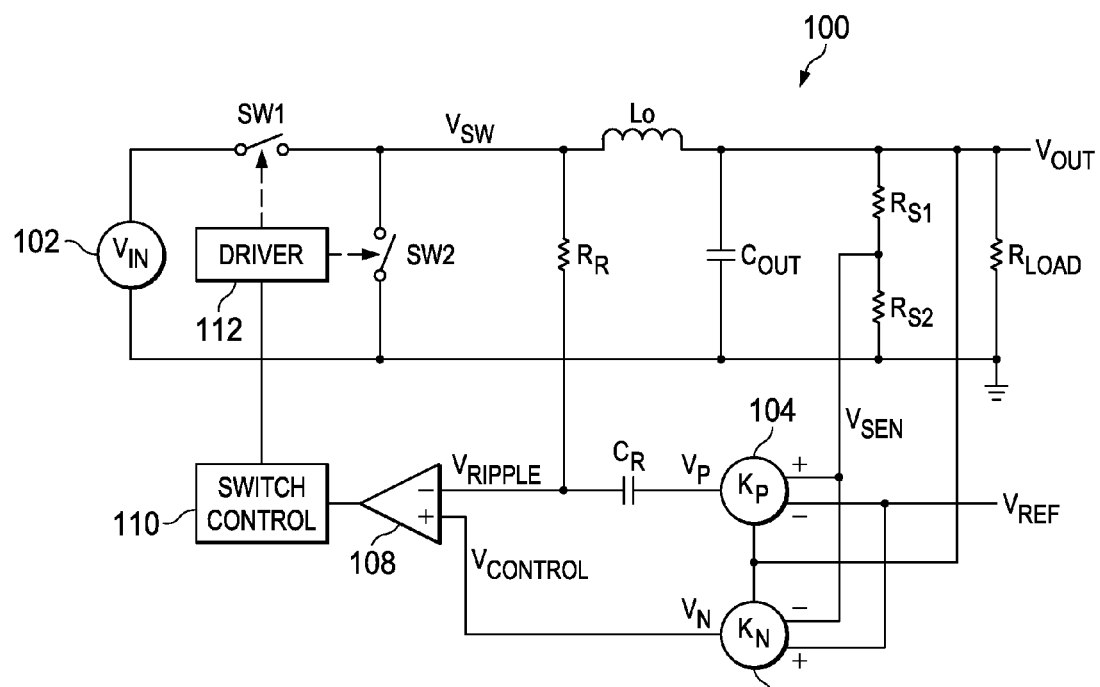
FIG. 1 is a schematic of a prior art single phase controller.
Figure 2:
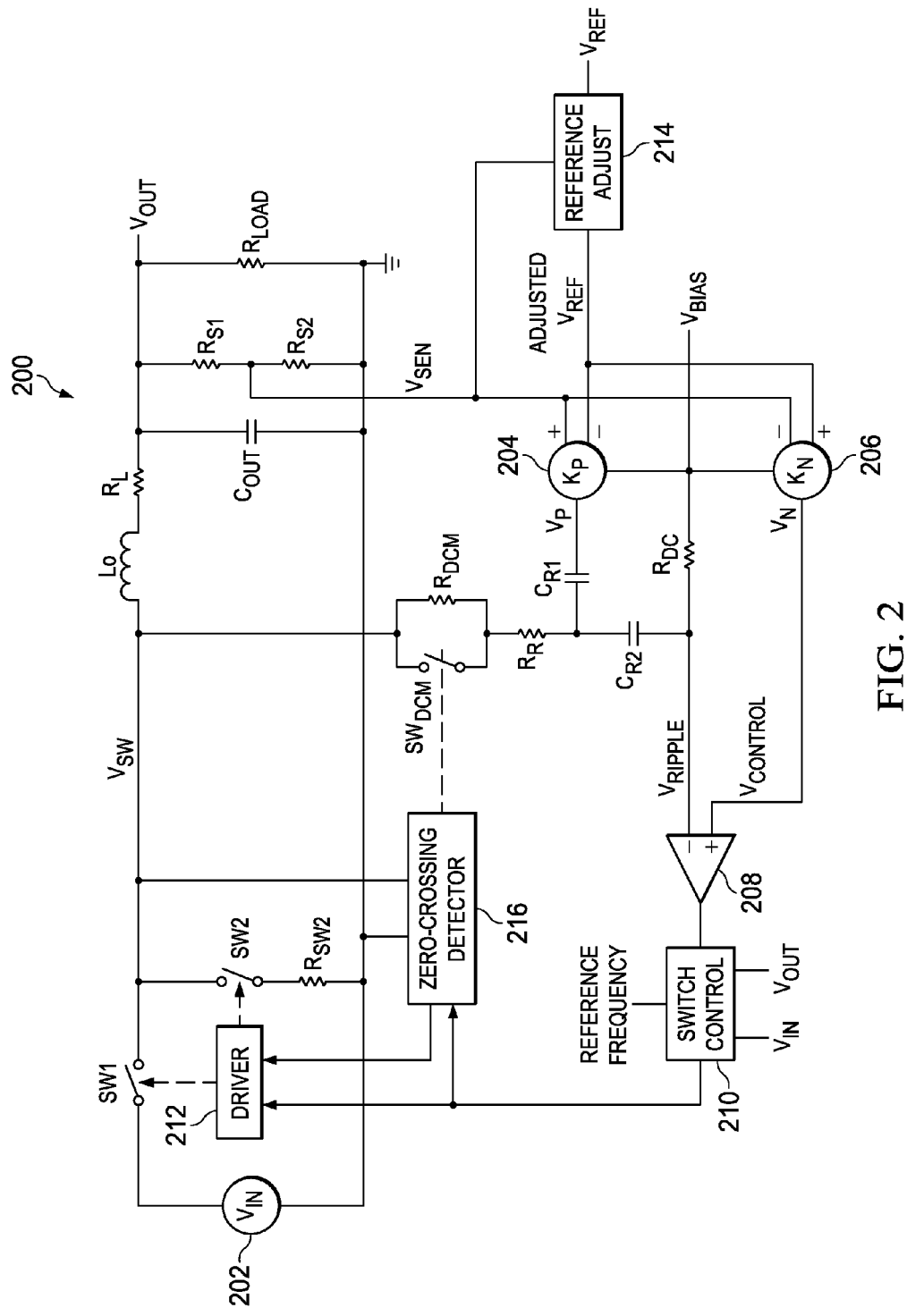
FIG. 2 is a schematic of a controller from co-pending application Ser. No. 13/171,283.
Figure 3:
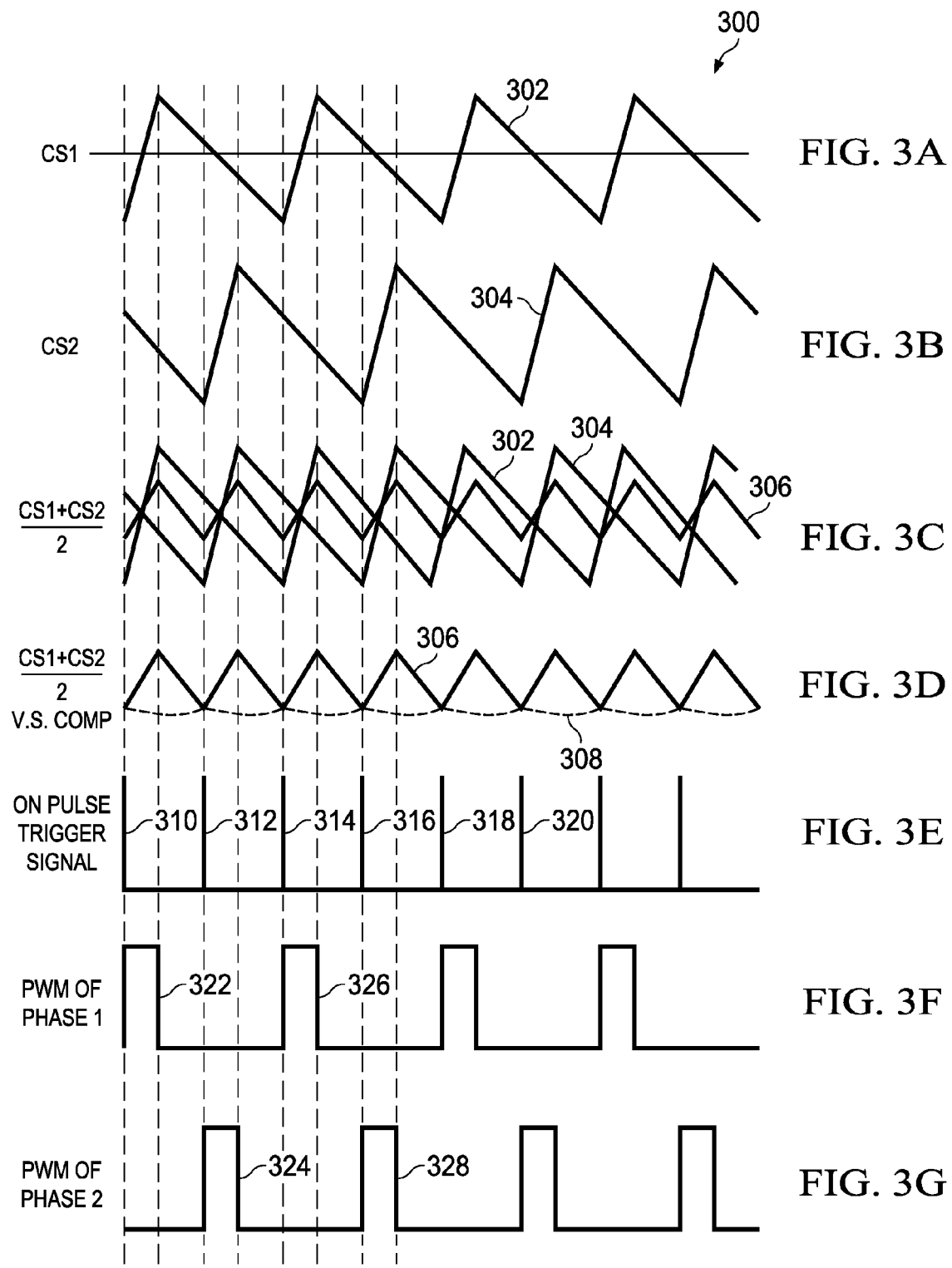
FIGS. 3A-3G illustrate the operation of a two phase DC to DC converter operating at 20% duty cycle.
Figure 4:
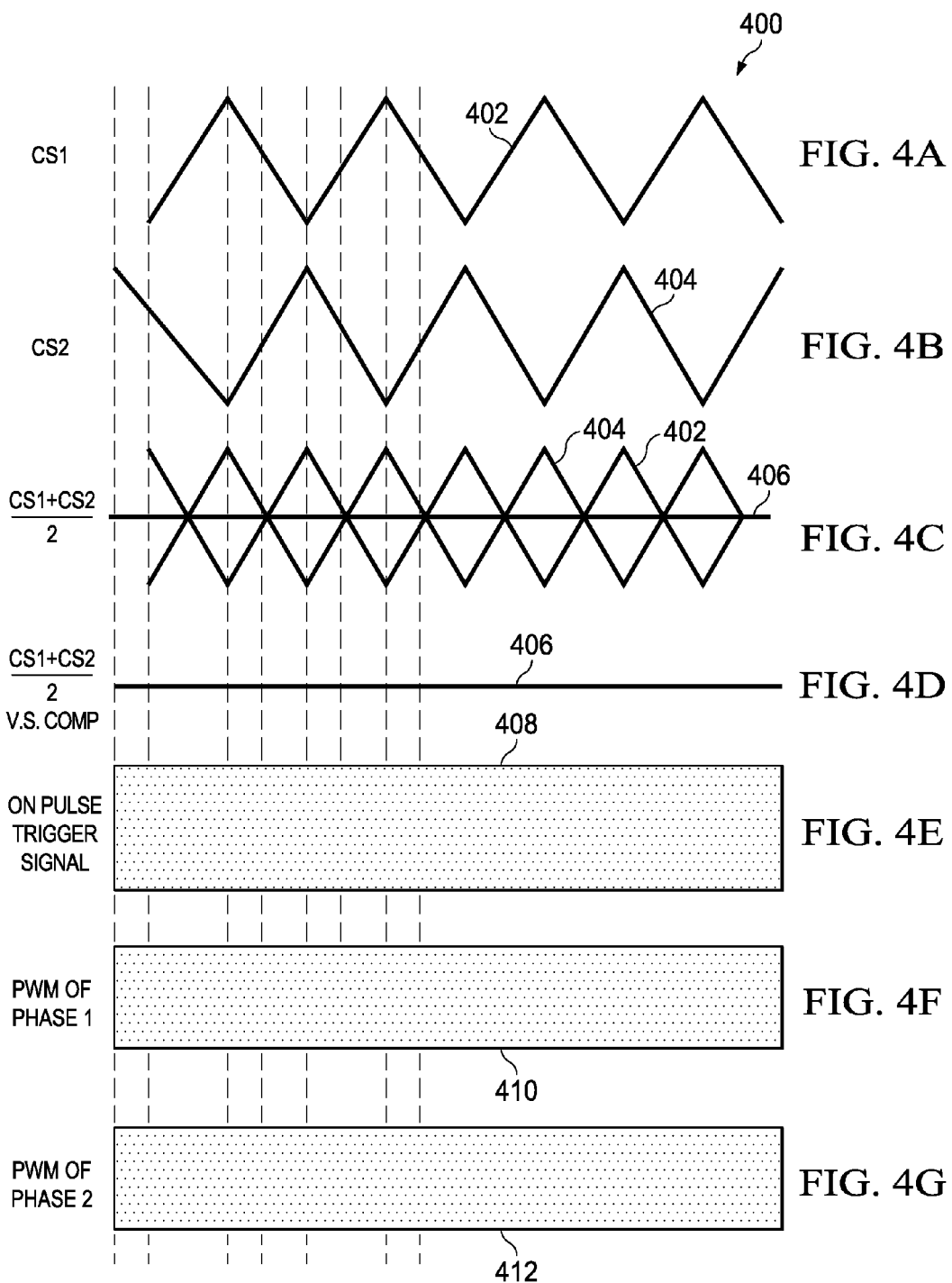
FIGS. 4A-4G illustrate the operation of a two-phase DC to DC converter operating at 50% duty cycle.
Figure 5:
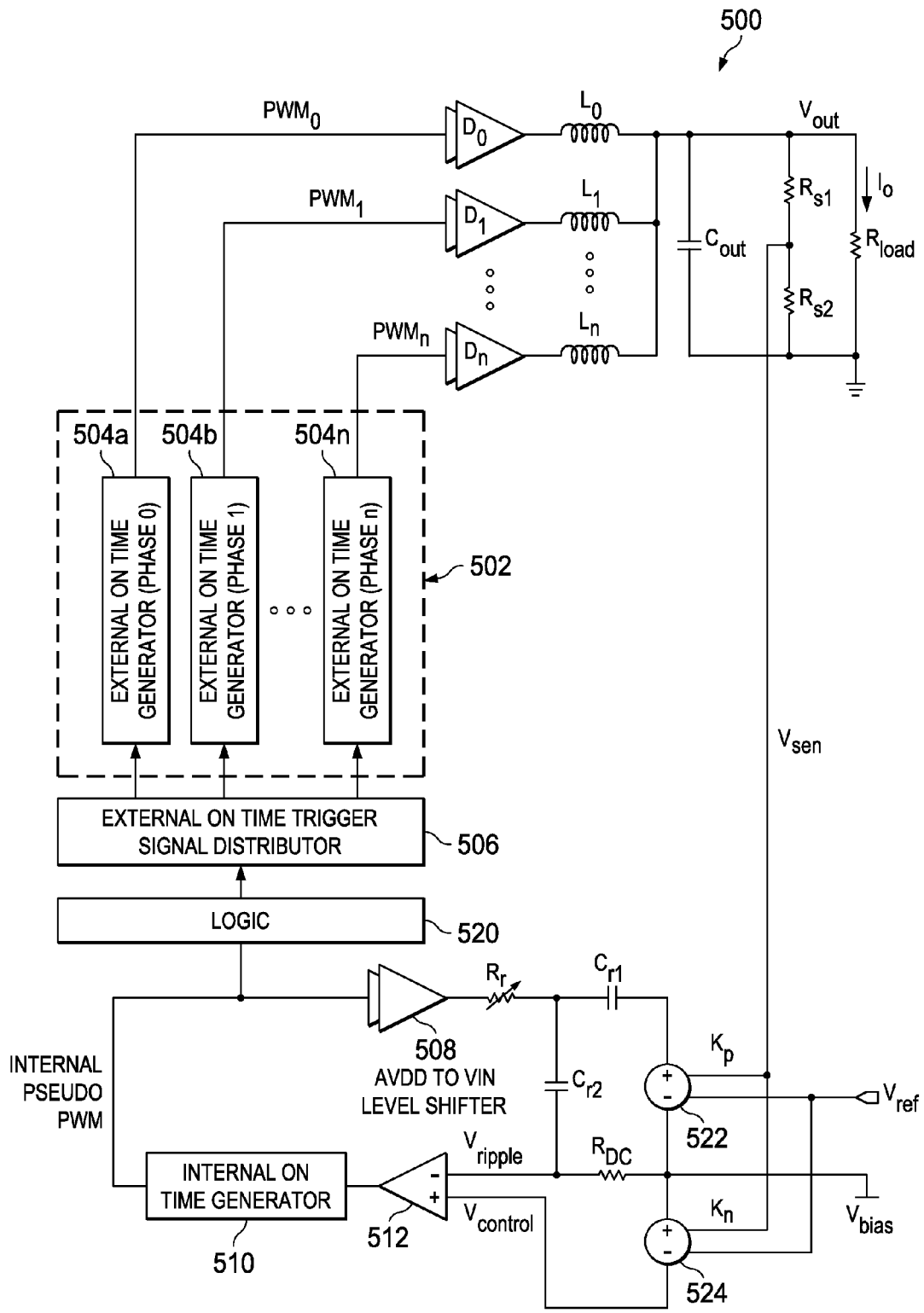
FIG. 5 is a schematic of an embodiment of the present invention.

FIG. 5 shows an embodiment of the present invention generally as 500. In FIG. 5, a plurality of DC to DC converters $PWM_0$, $PWM_1$ ... $PWM_n$ having inductors $L_0$, $L_1$ ... $L_n$ are connected in parallel to a single output terminal $V_{OUT}$. The terminal $V_{OUT}$ is connected to a load here represented as a resistor $R_{LOAD}$, having a current $I_0$. A capacitor $C_{OUT}$ and a pair resistors $R_{S1}$, $R_{S2}$ connected in series, are coupled in parallel across the load $R_{LOAD}$. The node between the two resisters is coupled to the noninverting input of differential difference amplifier 522 having a gain of $K_P$ and the noninverting input of differential difference amplifier 524 having a gain of $K_n$. The inverting inputs to the differential difference amplifiers 522 and 524 are coupled to a reference voltage $V_{REF}$. A bias voltage $V_{BIAS}$ is coupled to the differential difference amplifiers $K_P$ and $K_n$ and to a resistor $R_{DC}$, the distal end of which is coupled to the inverting input of a comparator 512. The output of differential difference amplifier 524 is coupled to the noninverting input of the comparator 512. The output of differential difference amplifier 522 is coupled to one terminal of capacitor $C_{r1}$ the other terminal of which is coupled through capacitor $C_{r2}$ to the inverting input of comparator 512. The node between capacitors $C_{r1}$ and $C_{r2}$ is coupled via resistor $R_r$ to the output of level shifter 508. The inverting input of comparator 512 receives the signal $V_{RIPPLE}$ and the noninverting input of comparative 512 receives the signal $V_{CONTROL}$. The output of comparator 512 is coupled to the input of internal ON time generator 510 which can be a one-shot, for example. The output of internal ON time generator 510 is coupled to the input of level shifter 508 and is coupled to the input of external ON time trigger signal distribution circuit 506 as the internal pseudo-PWM signal. The outputs of external ON time trigger signal generator 506 are coupled to an external ON time generator 502 comprising external ON time generator 504a for phase 0, external ON time generator 504b for phase 1 and external ON Time generator 504n for phase n. An output of external ON time generator 504a is coupled to an input of DC to DC converter $PWM_0$, an output of external ON time generator 504b is coupled to an input of DC to DC converter $PWM_1$, and the output of external ON time generator 504 in is coupled to an input of DC to DC converter $PWM_n$.

In an example embodiment, the resistor $R_r$ may be a variable resistor having an approximate resistance of 200 kΩ, capacitor $C_{r2}$ may have a capacitance of approximately 10 pF, capacitor $C_{r1}$ can have a capacitance of approximately 10 pF, resistor $R_{DC}$ can have a resistance of approximately 1MΩ and differential difference amplifiers 522 and 524, each may have a gain $K_P, K_n$ of approximately 20.

Figure 6:
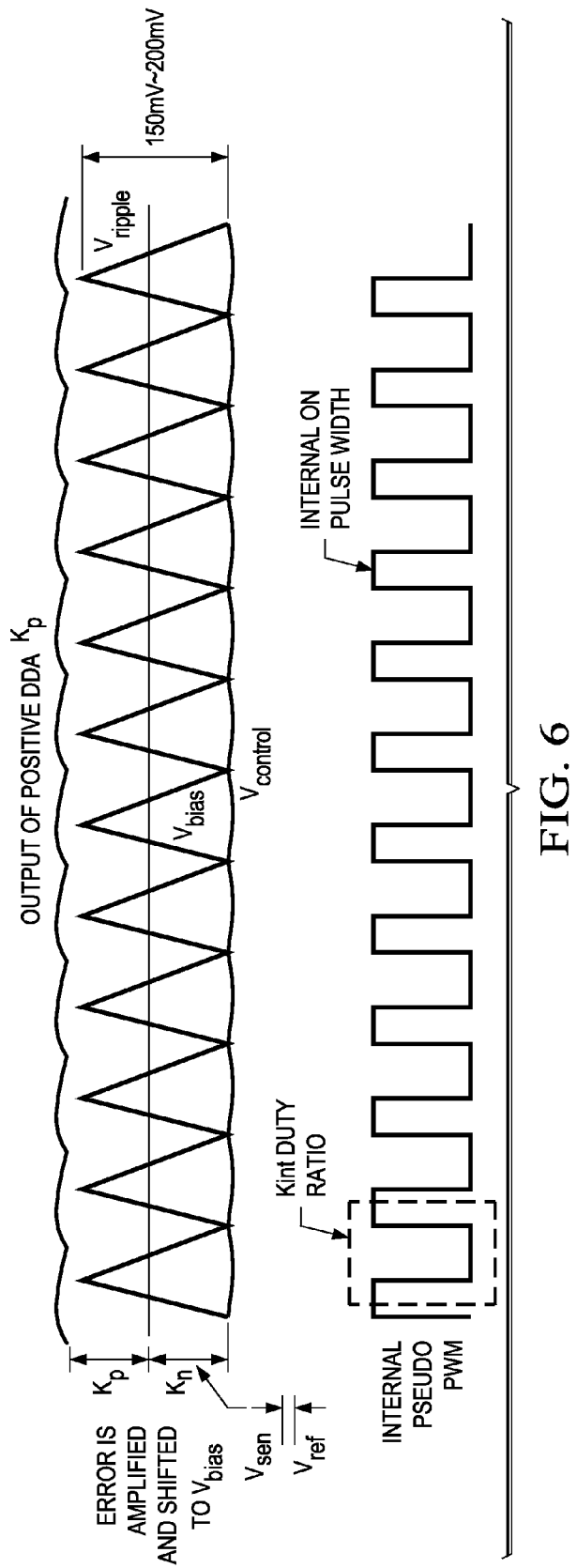
FIG. 6 is a drawing illustrating the waveforms of the embodiment of FIG. 5.

Operation of the circuit of FIG. 5 will now be explained in conjunction with FIGS. 6 and 7. The ripple voltage measured across the resistors $R_{S1}$ and $R_{S2}$ ($V_{SEN}$) is amplified by differential difference amplifier 522 the output of which is AC coupled via capacitors $C_{r1}$ and $C_{r2}$ to the ripple (inverting) input of comparator 512 as illustrated in FIGS. 5 and 6. The difference between the $V_{SEN}$ and the reference voltage $V_{REF}$ is amplified and shifted to $V_{BIAS}$. In view of the fact that resistor $R_{DC}$ is a high value, such as 1MΩ, this does not affect comparison with the ripple. The output of the differential difference amplifier 524 is coupled to the control (noninverting) input of comparator 512. The value of resistor $R_r$ is chosen to make the ripple amplitude about 150 mV to 200 mV. The resistor $R_{DC}$ keeps the middle point of the ripple at the same voltage $V_{BIAS}$. When the value of $V_{RIPPLE}$ falls below the voltage $V_{CONTROL}$, comparator 512 triggers internal ON time generator 510 to generate the internal pseudo-PWM signal having a duty ratio of Kint where Kint is a constant between substantially 0.1 to 1.0.

Figure 7:
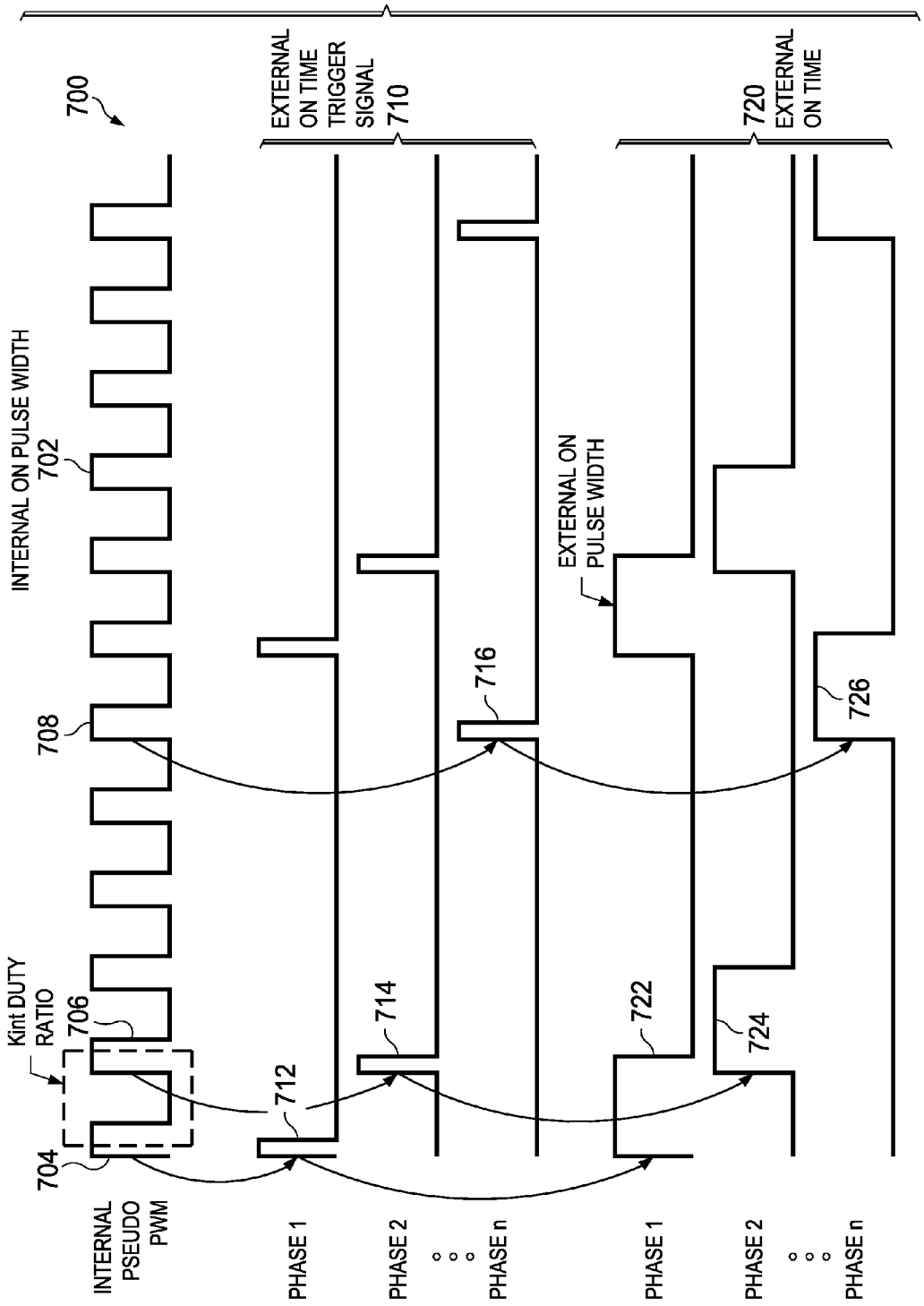
FIG. 7 is a drawing illustrating further waveforms of the embodiment of FIG. 5.

FIG. 7 illustrates the relationship between the internal pseudo-PWM signals 702, the external ON time trigger signals 710 and external ON time signals 720. The internal pseudo-PWM signal 702 is generated as described above in connection with FIG. 6. The external ON time trigger signal 704 is generated by the internal pseudo-PWM signal. The rising edge of internal pseudo-PWM signal 702 at pulse 704 triggers the generation of external ON time trigger signal 712 for the first phase, phase 1. The rising edge of the second pulse 706 of internal pseudo-PWM signal 702 triggers the generation of external ON time trigger signal 714 for the second phase, phase 2. The rising edge of the sixth pulse 708 of internal pseudo-PWM signal 702 triggers the generation of external ON time trigger signal 716 for the nth phase, where, in this example, n equals 6.

The external ON time trigger signals 710 are used to generate the external ON time signals 720 which are coupled to the driver circuits 502 (FIG. 5) and used to drive DC to DC converters $PWM_0 \ldots PWM_n$. Thus, trigger signal pulse 712 triggers pulse 722 for the first phase, phase 1. Pulse 714 triggers the pulse 724 for the second phase, phase 2. Pulse 716 triggers the pulse 726 for the nth phase, wherein this example, n equals 6. The external ON time trigger signal pulses 710 are distributed to the external ON time generator is 502 by external ON time trigger signal distributor circuit 506. The external ON time signals are generated in circuits 504a-504n.

The terms "internal" and "external" used above refer to a particular example embodiment in which the "internal" signals are generated on an integrated circuit and the "external" signals are generated in discrete components outside of the integrated circuit. It should be noted that this distinction is not required to practice the present invention. All the signals can be generated in discrete components or all of the elements with the exception of the inductors and output capacitor can be formed on an integrated circuit. In those embodiments, in which the "external" circuitry is outside the integrated circuit, a problem exists in that the internal suitable PWM signal is a high-frequency signal which must be sent along a printed circuit board to the external circuits. In order to reduce problems created by this high-frequency signal, and optional logic circuit 520 (FIG. 5) can be utilized. The operation of this logic circuit is explained in conjunction with FIG. 8.

Figure 8:
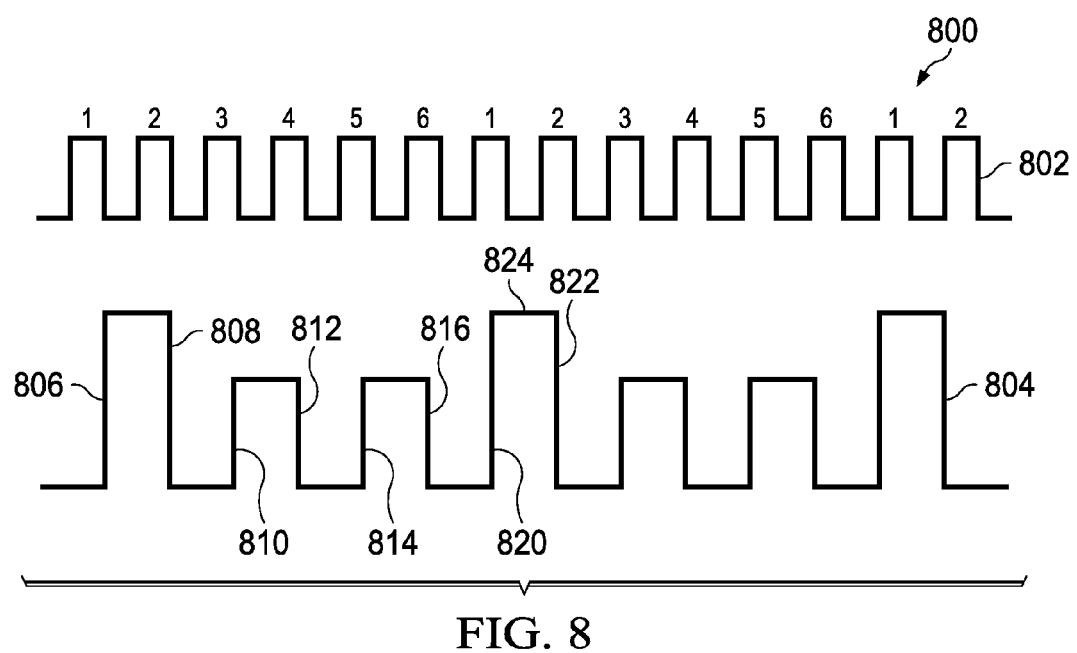
FIG. 8 illustrates the waveforms of a optional circuit for reducing the frequency of signals traveling across a printed circuit board.

In FIG. 8, the waveforms in and out of the logic circuit 520 are generally shown as 800. The signal 802 is the internal pseudo-PWM signal generated output of internal ON time generator 510. The signals 804 are the resulting clock pulses generated. The logic circuit 520 generates an output pulse having a rising edge corresponding to the rising edge of the first pulse 802 and a falling edge corresponding with rising edge of a second pulse 802. Pulses 1 and 2 of signal 802 generate the pulse having a rising edge 806 and a falling edge 808. The pulses 3 and 4 generate a clock pulse having a rising edge 810 and a falling edge 812. Pulses 5 and 6 of signal 802 generate a pulse having a rising age 814 and falling edge 816. FIG. 8 illustrates a system having six phases, as discussed above. Thus, in the second set of pulses, pulses 1 and 2 generate a signal 824 having a rising edge 820 and a falling edge 822 and the process repeats. Thus, the frequency of the signal distributed on the printed circuit board has been cut in half, reducing problems in its transmission. It should be noticed that the pulses 806 and 824 have a higher amplitude than the other pulses in the pulse string. This higher amplitude is used to synchronize the distribution of the pulses where the higher amplitude pulse would be distributed to the first phase of the DC to DC converter, for example.

Figure 9:
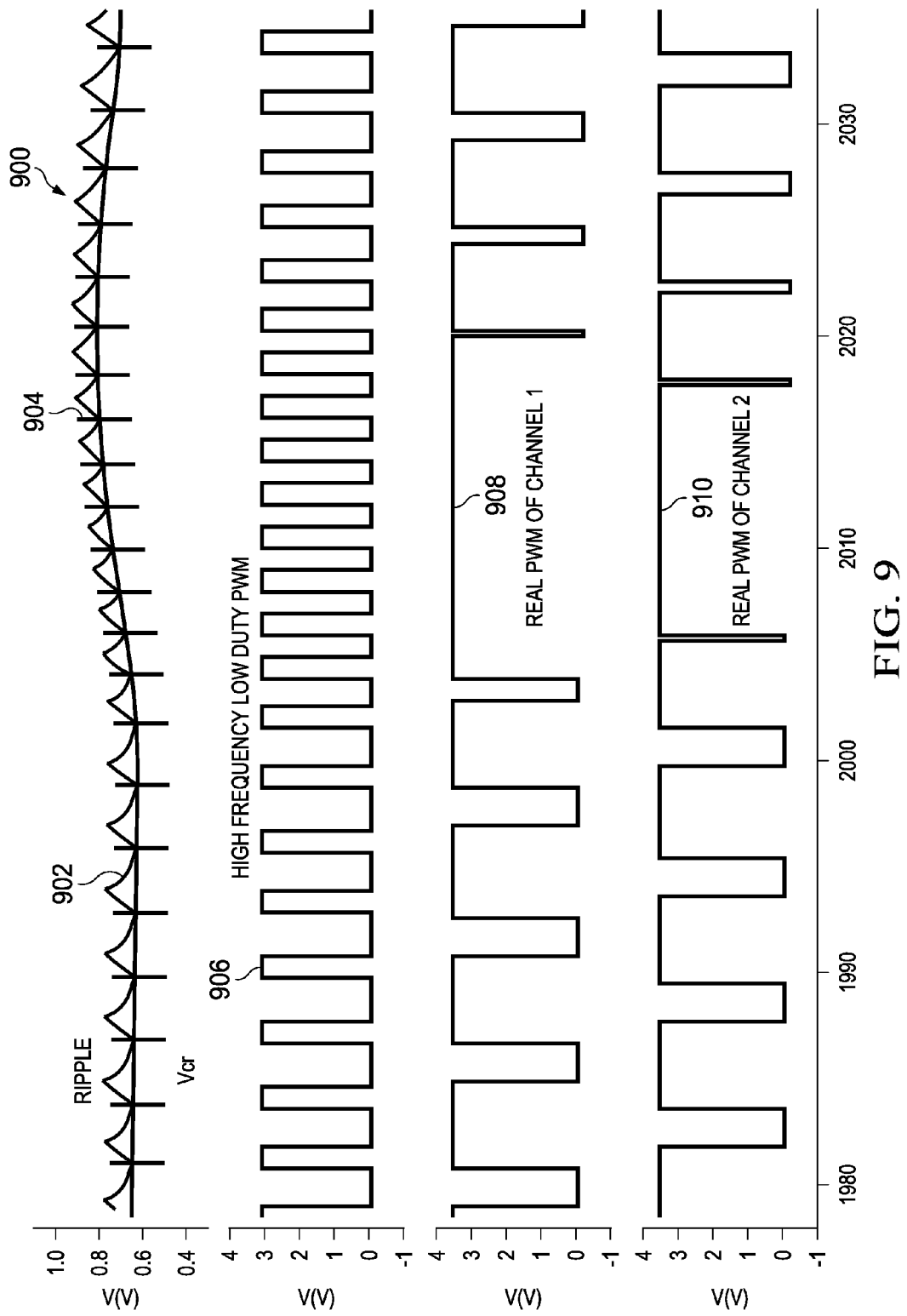
FIG. 9 illustrates the waveforms of a simulation for a two-phase converter according to the present invention, having an increasing load current.

FIG. 9 shows a simulation of a two phase converter operating with a 5 V input and a 3.5 V output and having a increasing load current, generally as 900. In FIG. 9, 902 represents the ripple voltage, 904 represents the control signal, 906 represents the signal such as 702, 908 and 910 represent the waveforms such as 722, 724.

Figure 10:
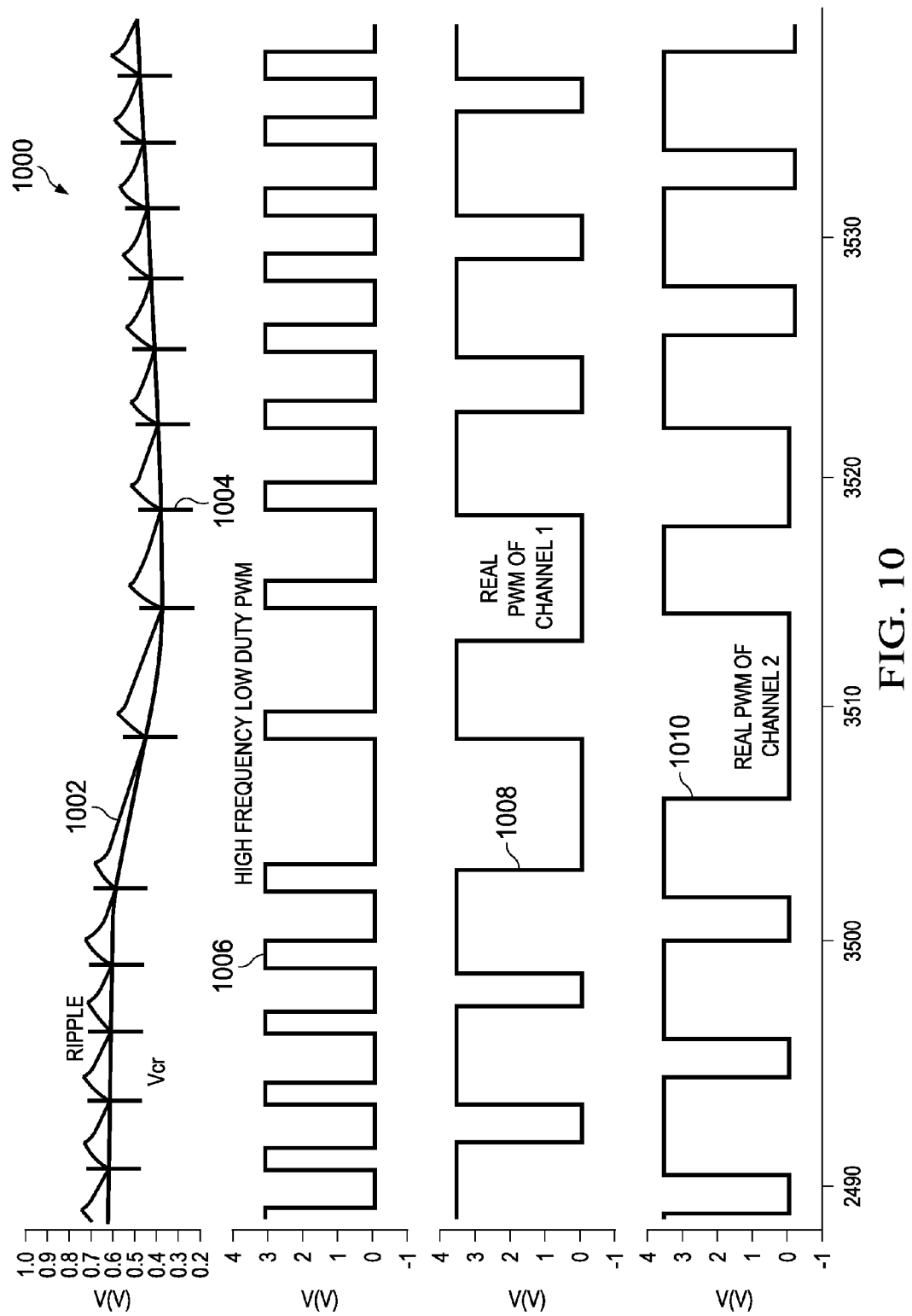
FIG. 10 illustrates the waveforms of a simulation for a two-phase converter according to the present invention having a decreasing load current.

FIG. 10 represents a simulation of the same converter having the same input and output voltages, but a decreasing load, generally as 1000. In FIG. 10, 1002 represents the ripple voltage, 1004 presents the control voltage, 1006 represents the signal such as 702, 906, and the signals 1008 and 1010 represent the signals such as 722, 908 and 724, 910.

Although the invention has been described in detail, it should be understood that various changes, substitutions and alterations can be made thereto without departing from the spirit and scope of the invention as defined by the appended claims.

The invention claimed is:

1. A multiphase power converter comprising:
DC to DC converters having separate inputs and having outputs connected together in an output terminal;
a voltage sensing circuit having an input coupled to the output terminal and having a voltage sense output;
an internal pulse generating circuit having an input coupled to the voltage sensing output and generating an internal pseudo-pulse width modulated signal;
logic circuitry having an input coupled to the modulated signal and including clock generator circuitry producing clock pulses from the modulated signal, the clock generator circuitry producing a rising edge of a clock pulse from a first modulated signal and generating a falling edge of the clock pulse from a next modulated signal, distribution of the clock pulses being synchronized by having a clock pulse for a phase at a higher amplitude than the other clock pulses;
an ON time trigger signal distribution circuit having an input coupled to the clock pulses and outputs each carrying an On time signal;
a circuit board carrying the On time signals; and
driver circuits, each driver circuit having an input coupled to one On time signal and having an output connected to a separate input of a DC to DC converter.

2. The multiphase power converter of claim 1 in which the plurality of DC to DC converters are buck converters.

3. The multiphase power converter of claim 1 in which the internal ON time signal width is approximately $Kint * 1/(f_{sw} * phase\ number)$, where $Kint = 0.1$ to $1.0$ $f_{sw}$=switching frequency of each DC to DC converter phase number=number of phases in the multiphase power converter.

4. The multiphase power converter of claim 1 including a ripple generator according to the duty cycle of the internal pseudo-pulse width modulated signal and the input voltage.

5. The multiphase power converter of claim 4 in which the ripple generator includes a resistor/capacitor network.

6. The multiphase power converter of claim 5 in which the resistor/capacitor network is coupled between an output of an ON time signal generator and the input to a comparator which triggers the ON time signal generator.

7. The multiphase power converter of claim 6 in which the ON time signal generator is a one-shot.

8. A method of driving a plurality of parallel connected DC to DC converters comprising:
sensing a voltage across an output of the converters;
generating a pseudo-pulse width modulated signal;
distributing a constant ON time signal to each of the plurality of DC to DC converters;
driving each of the plurality of DC to DC converters with the constant ON time signal;
in which the distribution of the constant ON time signal utilizes a clock signal in which a first pulse width modulated signal generates a rising edge of the clock signal and a second internal pulse width modulated signal generates a falling edge of the clock, the clock being synchronized to one of the phases by having a clock signal for that phase at a higher amplitude than a clock signal utilized for other phases.

* * * * *